(12) United States Patent
Sasu et al.

(10) Patent No.: US 7,862,262 B2
(45) Date of Patent: Jan. 4, 2011

(54) MULTI-FLUTE BALL ENDMILL FOR AIRFOIL MACHINING

(75) Inventors: Ioan Sasu, Brossard (CA); Bertrand Turcotte, Ste-Julie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 47 days.

(21) Appl. No.: 11/678,147

(22) Filed: Feb. 23, 2007

(65) Prior Publication Data
US 2008/0206000 A1 Aug. 28, 2008

(51) Int. Cl.
*B23B 51/00* (2006.01)
*B26D 1/12* (2006.01)
(52) U.S. Cl. ......................................... 407/53; 407/54
(58) Field of Classification Search .................. 407/53, 407/54, 55, 56
See application file for complete search history.

(56) References Cited

U.S. PATENT DOCUMENTS

| 3,058,199 | A | * | 10/1962 | Cave et al. ..................... 407/54 |
| 4,285,618 | A | * | 8/1981 | Shanley, Jr. .................. 407/54 |
| 4,565,475 | A | * | 1/1986 | Sygnator .................... 409/131 |
| 4,679,971 | A | * | 7/1987 | Maier ......................... 408/145 |
| 4,743,148 | A | * | 5/1988 | Wahlbeck ................... 409/137 |
| 6,164,876 | A | * | 12/2000 | Cordovano .................. 407/59 |
| 6,439,811 | B1 | * | 8/2002 | Wardell ....................... 407/54 |
| 6,588,990 | B2 | | 7/2003 | Aoki et al. |
| 6,905,312 | B2 | | 6/2005 | Bourgy et al. |
| 6,991,409 | B2 | * | 1/2006 | Noland ........................ 407/63 |

* cited by examiner

Primary Examiner—Will Fridie, Jr.
(74) Attorney, Agent, or Firm—Ogilvy Renault LLP

(57) ABSTRACT

A milling cutter comprises a shank section joined to a cutting section. The cutting section includes a plurality of peripheral teeth separated by a plurality of flutes to form cutting edges extending around the cutting section in a helix direction. The number of respective teeth and flutes is more than 12.

8 Claims, 4 Drawing Sheets

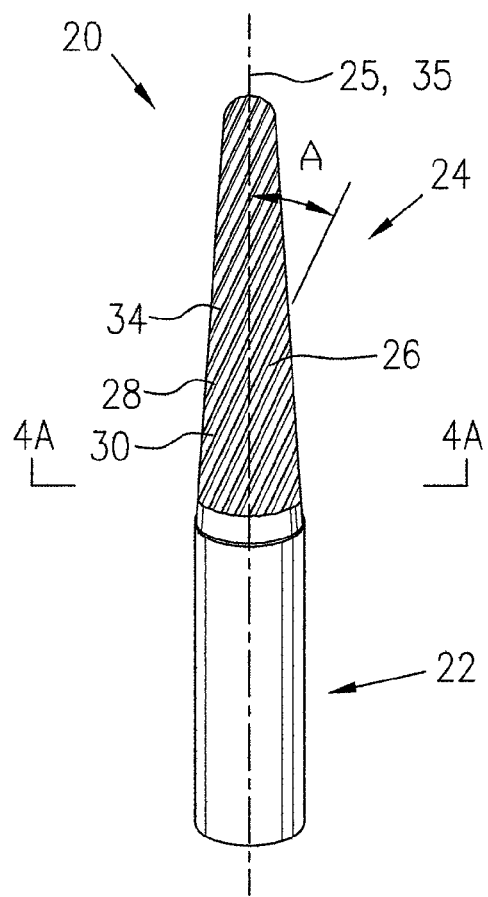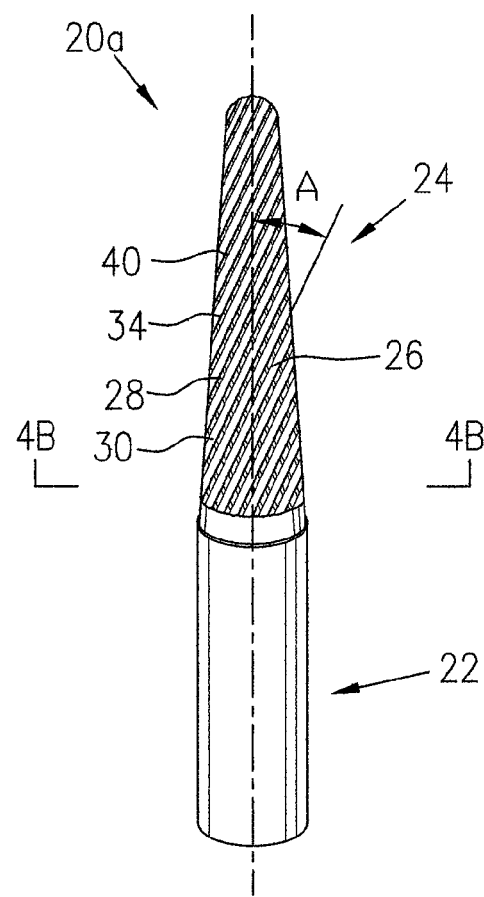

MULTI-FLUTE BALL ENDMILL FOR AIRFOIL MACHINING

TECHNICAL FIELD

The invention relates generally to rotary milling cutters, and more particularly to improved milling cutters for machining an integral rotor blade disc of a gas turbine engine.

BACKGROUND OF THE ART

Integrally Bladed Rotors (IBR's), also commonly known as "bladed discs" are important parts of gas turbine engines. Manufacturing IBR's is a challenging task due to the complex geometry of airfoil surfaces. Existing methods of manufacturing IBR airfoils include flank milling, point milling, etc. In a flank milling process, the periphery of an end mill, typically a tapered ball end mill, generates the desired airfoil surface geometry through one or more passes of the cutter. The tool used in a point milling process is usually a tapered ball end style milling cutter. In both cases (flank and point milling) the tools are small enough such that the entire diameter of the tool can fit between the airfoils of the IBR. These milling cutters have cutting teeth and flutes which either extend straight down the cutter, or can extend around the cutter in a helical direction. The helical blade arrangement is often preferred because when using that type of cutter, a portion of the tooth is always in contact with the work piece and the teeth tend to slice off cuttings rather than chip them away. The number of flutes and cutting teeth is conventionally limited to, for example 3 to 6, depending on the diameter of the milling cutters, in order to ensure a desired dimension of the flutes in particular, for accommodating the chips removed from parts during operation. However, such conventional milling cutters used for semi-finishing and finishing operations may suffer disadvantages of, for example, low productivity, poor airfoil surface finish, limited tool life, irrational us of expensive tool material, etc.

Accordingly, there is a need for optimization of milling cutters for semi-finishing and finishing machining of IBR airfoils.

SUMMARY OF THE INVENTION

It is therefore an object of this invention to provide an improved milling cutter for semi-finishing and finishing IBR's.

In one aspect, the present invention provides a milling cutter adapted to rotate about a longitudinal axis thereof during a milling operation, which comprises a shank section joined to a cutting section, the cutting section including a hard metal body with a plurality of peripheral teeth separated by a plurality of flutes, the peripheral teeth and flutes extending in a helical direction around the cutting section, each of the peripheral teeth having a rake face, a cutting edge and a clearing face, the number of flutes being greater than 6, going up to 50-60 flutes for tools with maximum diameter 1.250".

In another aspect, the present invention provides a milling cutter for machining an Integrally Bladed Rotor (IBR) having a rotor disc with a plurality of integral airfoils projecting outwardly from the rotor disc, the milling cutter being adapted to rotate about a longitudinal axis thereof during a milling operation and comprising a shank section joined to a cutting section having a transverse cross-section smaller than a circumferential space defined between adjacent airfoils, the cutting section including a hard metal body with a plurality of peripheral teeth separated by a plurality of flutes, the peripheral teeth and flutes extending in a helical direction around the cutting section, each of the peripheral teeth having a rake face, a cutting edge and a clearing face, the number of flutes being greater than 6.

Further details of these and other aspects of the present invention will be apparent from the detailed description and figures included below.

DESCRIPTION OF THE DRAWINGS

Reference is now made to the accompanying drawing depicting aspects of the present invention, in which:

FIG. 2 is a side elevational view of a milling cutter in accordance with one embodiment of the present invention;

FIG. 3 is a side elevational view of a milling cutter in accordance with another embodiment of the present invention;

DETAILED DESCRIPTION OF THE PREFERRED EMBODIMENTS

Figure 1:
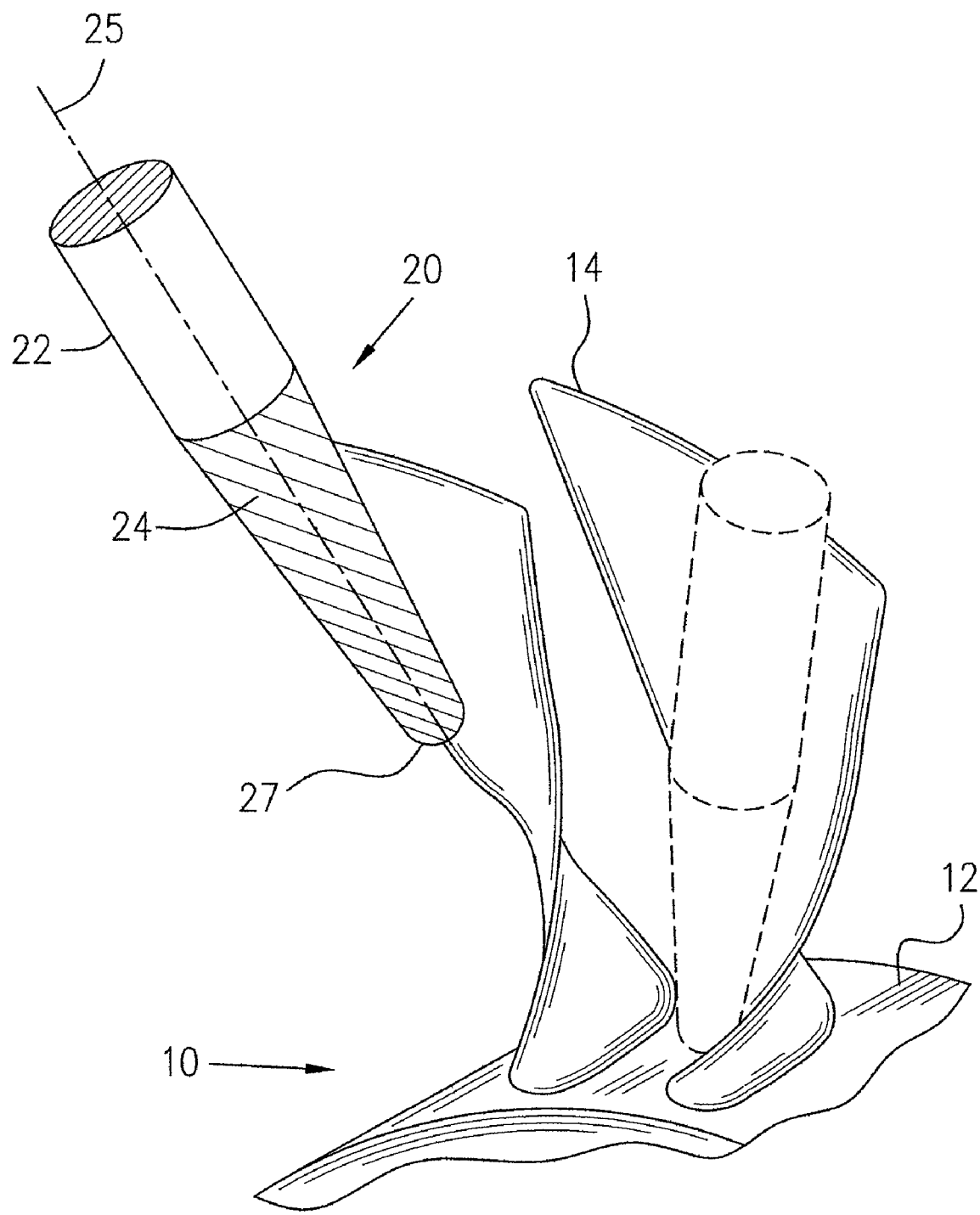
FIG. 1 is schematic illustration of one exemplary application of the present invention, showing a milling cutter of the present invention used for machining an Integrally Bladed Rotor of gas turbine engines.

FIG. 1 schematically illustrates a milling cutter of the present invention generally indicated by numeral 20, used, for example, for machining an Integrally Bladed Rotor (IBR) generally indicated by numeral 10, of a gas turbine engine. IBR 10 comprises a hub 12 and a plurality of integral airfoils 14 projecting substantially radially outwardly therefrom. Manufacturing IBR's is a challenging task not only due to the complex geometry of airfoil surfaces, and to the material such as titanium or nickel alloys of which IBR's are usually made, but also due to the blade flexibility and tool low rigidity, which generate chatter vibrations during cutting process.

The milling cutter 20 according to one embodiment of the present invention generally includes a shank section 22 which is preferably substantially cylindrical, joined to a cutting section 24. The milling cutter 20 is adapted to be mounted to a spindle of a milling machine (not shown) to rotate about a longitudinal axis 25 of the shank section 22. The longitudinal axis 25 is also the longitudinal axis of the milling cutter 20 during a milling operation. The cutting section 24 according to this embodiment is tapered (or conical), having a varying transverse cross-section thereof, diminishing from the shank section 22 to an end of the cutting section 24, preferably terminating in a rounded and more specifically, a hemispherical tip 27. Other details of the cutting section 24 are not shown in FIG. 1, but will be further described with reference to FIGS. 2 and 4 hereinafter. The tapered cutting section 24 with the hemispherical tip 27 (usually referred to as a ball end) is applied to an airfoil 14 in a milling operation. The milling cutter 20 has a substantially radial orientation with a small tangential inclination (with respect to the IBR 10). The cutting section 24 is moved to make successive passes at respective heights along the airfoil 14 in order to form the desired geometry of the airfoil 14. (The milling cutter shown in broken lines illustrates an operation for machining a portion of the airfoil 14 close to the hub 12.) Therefore, the cutting section 24 should have a transverse cross-section smaller than the circumferential space defined between adjacent airfoils 14 in order to allow the milling cutter 24 to be operated between the adjacent airfoils 14 of the IBR 10.

It is understood that tool geometry without appropriate optimization can cause serious problems during the cutting operations, such as excessive vibration, tool breakage, compromised tool surface finishing quality, damage to the airfoil, tool, tool holder and spindle bearings of the milling machine, etc. Particularly in a flank milling operation of IBR's, cutting tool geometry must be appropriately optimized in order to have stable cutting operation which are required for extremely deep cuts in a flank milling of an IBR. Therefore, milling cutters for machining IBR's are conventionally optimized with, for example, tool envelope geometry, cutting edge geometry and rake angle, clearance angles, etc. All of these optimizations play very important roles in pushing the flank milling applications to an upper limit of performance.

The present invention is directed to further optimizing a milling cutter by the number of flutes and cutting edges, and thus the dimensions of the cutting teeth and flutes. Due to the limited number of flutes (usually 3 to 6), conventional ball and mill cutters have disadvantages in a flank milling operation of IBR's. For example, productivity is relatively low due to a limited metal removal rate and poor airfoil surface finish is due to cutter vibration caused by usually only one cutting blade contact. Furthermore, tool life is limited because the small number of flutes (and thus teeth) allows for only limited allowable part/tool wear. The expensive tool material (carbide) is irrationally used due to the fact that the flutes and teeth are very large for removing relatively small chips, particularly in finishing and semi-finishing processes of an IBR operation.

In accordance with the present invention, a multi-flute milling cutter for finishing and semi-finishing process of an IBR operation advantageously overcomes the shortcomings of conventional milling cutters having a limited number of flutes. In a finishing and semi-finishing operation, the depth of cut is very small (0.001" to 0.003" for finishing and 0.003" to 0.005" for semi-finishing), which results in very small chips which can be evacuated by relatively small flutes of the milling cutters of the present invention in contrast to the relatively large flutes of conventional milling cutters. The smaller the flutes are, the more flutes and thus cutting teeth, can be arranged on the periphery of a milling cutter. Therefore, the milling cutter of the present invention is provided with at least 15 flutes, preferably 20 to 25 flutes, the advantages of which will be further discussed hereinafter. This number of flutes depends on the size of the cutter, going up to 50-60 flute for cutters with the maximum diameter of 1.250".

As illustrated in FIGS. 2 and 4, the cutting section 24 of the milling cutter 20 according to this embodiment of the present invention, includes a hard metal body 26 preferably integrated with the shank section 22 as a one-piece tool. The hard metal body 26 of the cutting section 24 defines a plurality of peripheral teeth 28 separated by a plurality of flutes 30. In this particular embodiment, the number of respective teeth 28 and flutes 30 is twenty. Each of the peripheral teeth 28 preferably includes a rake face 32, a cutting edge 34 on the rake face 32, a land 36 and a clearing face 38.

Figures 4A, 4B:
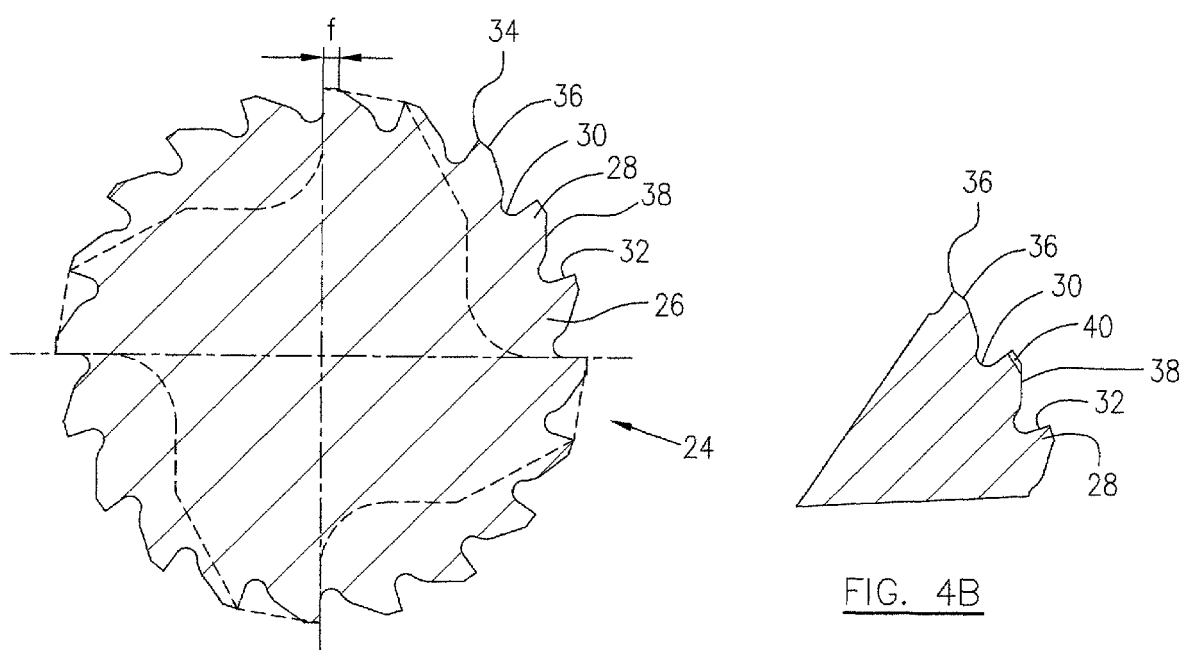
FIG. 4A is a cross-sectional view taken along line 4A-4A of FIG. 2, showing the peripheral details of a cutting section of the milling cutter.
FIG. 4B is a partial cross-sectional view taken along line 4B-4B of FIG. 3, showing the peripheral details of a cutting section of the milling cutter.

In a cross-section as shown in FIG. 4, the rake face 32 of the tooth 28 extends from the cutting edge 34 towards and is smoothly connected with a concavely curved bottom (not indicated) of an adjacent flute 30. The land 36 is a circumferential section of the circular periphery of the hard metal body 26 of the cutting section 24, and extends between the cutting edge 34 and an adjacent flute 30 located circumferentially therebehind. The land 36 is not larger than 0.002"-0.004" (see "f" in FIG. 4A). The land 36 functions to support and strengthen the cutting edge 34 against cutting forces and acts as a dumper against chatter vibrations. The clearing face 38 extends between the land 36 of the tooth 28 and the concavely curved bottom of another adjacent flute 30 located circumferentially behind that tooth 28.

The respective teeth 28 and flutes 30, and thus each of the cutting edges 34, extend around the cutting section 24 in a helix direction, and define a helix angle A see FIGS. 2 and 3) between the cutting edge 34 and a line 35 which extends parallel to the longitudinal axis 25 of the milling cutter 20 of FIGS. 2 and 3, intersecting the cutting edge 34. The helix angle A is usually between 10-40 degrees.

It should be noted that the circumferential dimension of flutes 30 and thus teeth 28, is much smaller than that of conventional milling cutters, an example of which is shown in broken lines in FIG. 4A for comparison, because the flutes 30 and thus teeth 28 significantly are increased in number and must be arranged on the periphery, the dimension of which does not change when the dimension of the cutting section 24 remains substantially the same. The depth of the flutes 30 is reduced accordingly in order to maintain an appropriate geometry of the cutting section 24. As discussed above, the depth of cut is very small, which results in very small chips. Therefore, small flutes 30 are sufficient to evacuate these chips.

In contrast to the conventional tapered ball end milling cutters, the milling cutter 20 of the present invention advantageously and drastically reduces tool/part vibration during a finishing operation of airfoils such as blades of IBR's, fans, etc., thereby improving the quality of the surface finishing because the increased number of flutes (and thus the cutting edges 34) and significantly reduced circumferential space between cutting edges 34 provide continuous contact between the cutting section 24 of the milling cutter 20 and the part (the airfoil). Therefore, the cutting section 24 and the circumferential lands 36 in response to the cutting forces, reacts as a damper against the flexibility of the airfoils. This results in an improvement in the surface finishing of the airfoils.

While the load per cutting edge (IPT load per tooth) and the velocity of cutting edges (RPM—rotation per minute) remain the same, the feed (IPM—feed per minute) may be increased significantly due to the increased cutting contacts per rotation of the milling cutter 20, resulting in increased productivity measured as metal removal weight (CIN/MIN).

It is also apparent that tool rigidity is increased because of the smaller depth of flutes. The expensive tool material (carbide) is rationally used because the higher number of flutes and teeth per tool results in a decrease in the actual machining time per cutting edge when the same volume of material is removed. This results in longer tool life for the same allowable wear.

FIG. 3 illustrates another embodiment of the present invention, in which a milling cutter 20A is substantially similar to the milling cutter 20 of FIGS. 1 and 2 and similar parts, indicated by similar numerals, will not therefore be redundantly described hereinafter. In addition to the features already described with reference to FIGS. 1, 2 and 4, the milling cutter 20A shown in FIG. 3 further includes at least one groove, preferably a number of grooves 40, interrupting the continuity of each cutting edge 34 (also see FIG. 4B) to function as chip breakers. The groove 40 preferably has a depth shallower than the depth of flutes 30 and deeper than the radial depth of cut. In the embodiment of FIG. 3, milling cutter 20A has a number of grooves 40 extending around the cutting section 24 in a helical direction substantially opposite to the helical direction of the teeth 28 and flutes 30. The grooves 40 reduce the chip length and the cutting force, which may be desirable in a milling operation, particularly for a semi-finishing process of airfoils.

Figure 5B:
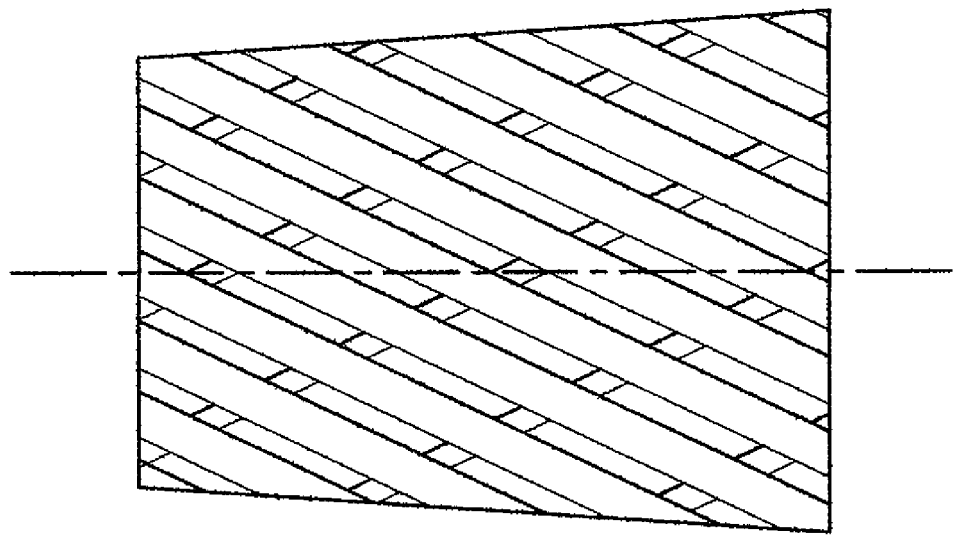
FIGS. 5A and 5B in partial side elevational views, illustrate milling cutters with further embodiments of the present invention.
Figure 5A:
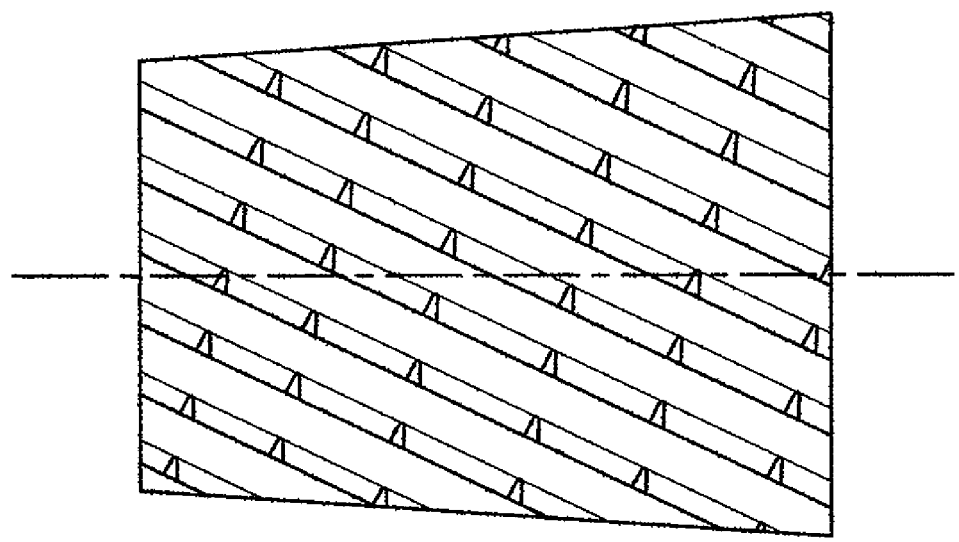

FIGS. 5A and 5B illustrate more embodiments of the present invention in which grooves are provided in different numbers, depths and helical angles to form different patterns of chip breakers.

The present invention is applicable to milling tools for machining IBR's in a flank milling operations, semi-finishing and/or finishing operations. It should also be understood that the present invention is also applicable to other milling cutters adapted to machine work pieces other than IBR's of gas turbine engines e.g. impellers, fans, etc.

The above description is meant to be exemplary only, and one skilled in the art will recognize that changes may be made to the embodiments described without departure from the scope of the invention disclosed. For example, the cutting section of the milling cutters may include other features not shown in the above-described embodiments or may be configured with a geometry having details different from those described. It is also understood that although one type of IBR of gas turbine engines is illustrated in the drawings for description of the embodiment of the present invention, this invention can be equally applicable to the machining of airfoils of other types of IBR's such as an impeller, fan, or even work pieces other than IBR's. Still other modifications which fall within the scope of the present invention will be apparent to those skilled in the art, in light of a review of this disclosure, and such modifications are intended to fall within the appended claims.

The invention claimed is:

1. A milling cutter adapted to rotate about a longitudinal axis thereof during a milling operation, the milling cutter comprising a shank section joined to a cutting section, the cutting section being substantially tapered, having a varying transverse cross section diminishing from the shank section to an end of the cutting section, the cutting section including a hard metal body with a plurality of peripheral cutting teeth substantially equally spaced by a plurality of radially concavely curved flutes, the peripheral teeth and flutes extending in a helical direction around the cutting section, each of the peripheral cutting teeth having a rake face, a cutting edge, a land and a clearing face, the rake face extending from the cutting edge toward, and being smoothly connected with, a concavely curved bottom of an adjacent flute, each cutting edge being defined on a circular periphery of the hard metal body, the number of flutes being greater than 14.

2. The milling cutter as defined in claim 1 wherein the shank section is substantially cylindrical.

3. The milling cutter as defined in claim 1 wherein the cutting section is substantially cylindrical.

4. The milling cutter as defined in claim 1 wherein the cutting section comprises a ball end thereof.

5. The milling cutter as defined in claim 1 wherein each of the peripheral cutting teeth comprises at least one groove, the groove interrupting the continuity of the cutting edge of the peripheral cutting tooth.

6. A milling cutter for machining an Integrally Bladed Rotor (IBR) having a rotor disc with a plurality of integral airfoils projecting outwardly from the rotor disc, the milling cutter being adapted to rotate about a longitudinal axis thereof during a milling operation and comprising a shank section joined to a cutting section having a transverse cross-section smaller than a circumferential space defined between adjacent airfoils, the cutting section including a hard metal body with a plurality of peripheral cutting teeth substantially equally spaced by a plurality of radially concavely curved flutes, the peripheral cutting teeth and flutes extending in a helical direction around the cutting section, each of the peripheral cutting teeth having a rake face, a cutting edge and a clearing face, the rake face extending from the cutting edge toward, and being smoothly connected with a concavely curved bottom of an adjacent flute, each cutting edge being defined on a circular periphery of the hard metal body, the number of flutes being between 15 and 60, wherein the cutting section comprises a ball end thereof, and wherein the transverse cross-section of the cutting section varies, diminishing from the shank section to the ball end.

7. The milling cutter as defined in claim 6 wherein each of the peripheral cutting teeth comprises at least one of groove, the groove interrupting the continuity of the cutting edge of the peripheral cutting tooth.

8. The milling cutter as defined in claim 1 wherein the number of flutes is less than 60.

* * * * *